US010358977B2

(12) United States Patent
Gagne et al.

(10) Patent No.: US 10,358,977 B2
(45) Date of Patent: Jul. 23, 2019

(54) PHASE CHANGE MATERIAL COOLING SYSTEM FOR A VEHICLE

(71) Applicant: Rolls-Royce North American Technologies, Inc., Indianapolis, IN (US)

(72) Inventors: Steven Gagne, Avon, IN (US); Rigoberto Rodriguez, Avon, IN (US); William L. Siegel, Woodbridge, VA (US); John R. Arvin, Panama City Beach, FL (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 268 days.

(21) Appl. No.: 15/358,444

(22) Filed: Nov. 22, 2016

(65) Prior Publication Data

US 2017/0074166 A1    Mar. 16, 2017

Related U.S. Application Data

(62) Division of application No. 13/432,590, filed on Mar. 28, 2012.

(51) Int. Cl.
*F02C 7/32* (2006.01)
*F02C 6/08* (2006.01)
(Continued)

(52) U.S. Cl.
CPC .............. *F02C 7/141* (2013.01); *F01D 15/08* (2013.01); *F01D 15/10* (2013.01); *F02C 3/04* (2013.01);
(Continued)

(58) Field of Classification Search
CPC .............. F41H 13/0043; F41H 13/005; F41H 13/0056; F41H 13/0062;
(Continued)

(56) References Cited

U.S. PATENT DOCUMENTS

| 512,446 A | 1/1894 | Thomas |
| 1,730,111 A | 10/1929 | Barlow |

(Continued)

FOREIGN PATENT DOCUMENTS

| EP | 362796 | 4/1990 |
| EP | 1384967 | 1/2004 |
| EP | 2691251 A1 | 2/2014 |
| GB | 456335 | 11/1936 |
| WO | 2010121255 A1 | 10/2010 |

OTHER PUBLICATIONS

European Official Action dated Jun. 22, 2018 issued in connection with European Patent Appln. No. 16163686.5.
(Continued)

*Primary Examiner* — Todd E Manahan
*Assistant Examiner* — Eric W Linderman
(74) *Attorney, Agent, or Firm* — Barnes & Thornburg LLP (57) ABSTRACT

A system is disclosed one form of which is an aircraft that includes a pod capable of housing a work providing device. The pod can also include a thermal conditioning system and a power generation device that can be powered from the work providing device. The pod can provide thermal conditioning services and power services to a payload aboard the aircraft. In one non-limiting form the payload is a directed energy member that can be cooled using the thermal conditioning system and powered using the power generation device.

11 Claims, 4 Drawing Sheets

(51) Int. Cl.
  *F02C 7/141* (2006.01)
  *F02C 6/20* (2006.01)
  *F02C 7/12* (2006.01)
  *F01D 15/10* (2006.01)
  *F41H 13/00* (2006.01)
  *F01D 15/08* (2006.01)
  *F02C 3/04* (2006.01)
  *F02C 7/16* (2006.01)
  *F25B 23/00* (2006.01)
  *H02K 7/18* (2006.01)

(52) U.S. Cl.
  CPC ............... *F02C 6/08* (2013.01); *F02C 6/20* (2013.01); *F02C 7/12* (2013.01); *F02C 7/16* (2013.01); *F02C 7/32* (2013.01); *F25B 23/00* (2013.01); *F41H 13/005* (2013.01); *F41H 13/0068* (2013.01); *H02K 7/1823* (2013.01); *F05D 2220/323* (2013.01); *F05D 2220/50* (2013.01); *F05D 2220/76* (2013.01); *F05D 2240/35* (2013.01); *F05D 2260/207* (2013.01); *F25B 2400/24* (2013.01); *Y02T 50/675* (2013.01); *Y02T 50/676* (2013.01)

(58) Field of Classification Search
  CPC .. B60H 2001/00307; F02C 7/141; F02C 7/12; F02C 7/16; F02C 7/32; F01D 15/08; F01D 15/10; F25B 23/00; H02K 7/123
  See application file for complete search history.

(56) References Cited

U.S. PATENT DOCUMENTS

| | | | |
|---|---|---|---|
| 2,902,597 | A | 9/1959 | Leidy |
| 3,098,632 | A | 7/1963 | Christenson |
| 3,106,369 | A | 10/1963 | Borst |
| 3,313,500 | A | 4/1967 | Schmitt |
| 3,324,675 | A | 6/1967 | Mills |
| 3,489,377 | A | 1/1970 | Pearsons et al. |
| 3,623,494 | A | 11/1971 | Poucher |
| 3,674,049 | A * | 7/1972 | Macgregor ............ B64D 39/02 137/355.2 |
| 3,746,283 | A | 7/1973 | Morgan |
| 3,776,305 | A | 12/1973 | Simmons |
| 3,783,935 | A | 1/1974 | Simmons et al. |
| 3,804,353 | A | 4/1974 | Scott et al. |
| 4,031,710 | A | 6/1977 | Rideout |
| 4,043,522 | A | 8/1977 | Vetter |
| 4,044,369 | A | 8/1977 | Haws et al. |
| 4,057,104 | A | 11/1977 | Altoz |
| 4,167,008 | A * | 9/1979 | Blickenstaff ............ F41H 11/02 222/630 |
| 4,209,993 | A | 7/1980 | Rannenberg |
| 4,384,453 | A | 5/1983 | Tudor et al. |
| 4,399,665 | A | 8/1983 | Evans et al. |
| 4,494,384 | A | 1/1985 | Lott |
| 4,635,709 | A * | 1/1987 | Altoz ................ F28D 15/0233 165/104.33 |
| 4,674,704 | A | 6/1987 | Altoz et al. |
| 4,684,081 | A | 8/1987 | Cronin |
| 4,706,908 | A | 11/1987 | Huffman et al. |
| 4,750,543 | A | 6/1988 | Edelstein |
| 4,830,096 | A | 5/1989 | Biagini |
| 4,869,071 | A | 9/1989 | Wehner et al. |
| 4,905,937 | A * | 3/1990 | Spotswood ............ B64C 1/36 244/135 A |
| 5,020,411 | A | 6/1991 | Rowan et al. |
| 5,025,634 | A | 6/1991 | Dressler et al. |
| 5,094,587 | A | 3/1992 | Woollenweber |
| 5,097,892 | A | 3/1992 | Beamer |
| 5,129,446 | A | 7/1992 | Beamer |
| 5,141,178 | A * | 8/1992 | Alden ................ B64D 39/02 242/483 |
| 5,148,859 | A | 9/1992 | Beamer |
| 5,201,182 | A | 4/1993 | Grignon et al. |
| 5,207,559 | A * | 5/1993 | Clevenger ............ F01D 17/165 415/166 |
| 5,209,056 | A * | 5/1993 | Shekleton ............ B64D 41/00 431/6 |
| 5,311,528 | A | 5/1994 | Fujino |
| 5,490,645 | A | 2/1996 | Woodhouse et al. |
| 5,601,406 | A * | 2/1997 | Chan ................ F01D 21/045 415/206 |
| 5,644,608 | A | 7/1997 | Malik et al. |
| 5,667,168 | A | 9/1997 | Fluegel |
| 5,702,073 | A | 12/1997 | Fluegel |
| 5,802,860 | A | 9/1998 | Barrows |
| 5,898,211 | A | 4/1999 | Marshall et al. |
| 5,899,085 | A | 5/1999 | Williams |
| 6,000,210 | A | 12/1999 | Negulescu |
| 6,102,332 | A * | 8/2000 | Haxton ................ B64C 39/02 244/118.2 |
| 6,182,435 | B1 | 7/2001 | Niggemann et al. |
| 6,568,633 | B2 | 5/2003 | Dunn |
| 6,578,491 | B2 | 6/2003 | Babin |
| 6,581,872 | B2 | 6/2003 | Walmsley |
| 6,658,881 | B1 * | 12/2003 | Plattner ................ B64D 13/00 62/239 |
| 6,663,044 | B1 | 12/2003 | Munoz et al. |
| 6,868,664 | B2 | 3/2005 | Albero et al. |
| 6,942,181 | B2 | 9/2005 | Dionne |
| 6,948,331 | B1 | 9/2005 | Ho |
| 7,007,501 | B2 | 3/2006 | Hu |
| 7,147,071 | B2 | 12/2006 | Gering et al. |
| 7,246,658 | B2 | 7/2007 | Wyatt et al. |
| 7,284,363 | B2 | 10/2007 | Kung et al. |
| 7,364,117 | B2 * | 4/2008 | Dionne ................ B64D 33/08 244/58 |
| 7,484,354 | B2 | 4/2009 | Stretton |
| 7,520,465 | B2 | 4/2009 | Mahjoub |
| 7,610,841 | B2 * | 11/2009 | Padan ................ B64D 1/04 244/118.1 |
| 7,624,592 | B2 | 12/2009 | Lui et al. |
| 7,673,459 | B2 | 3/2010 | Sheldon et al. |
| 7,721,554 | B2 | 5/2010 | Balan et al. |
| 8,127,758 | B2 | 3/2012 | Atreya et al. |
| 8,157,503 | B2 | 4/2012 | Junod |
| 8,636,051 | B2 | 1/2014 | Weber et al. |
| 9,327,577 | B2 | 5/2016 | Lombardo |
| 2003/0230671 | A1 | 12/2003 | Dunn |
| 2004/0129014 | A1 | 7/2004 | Richman et al. |
| 2005/0279098 | A1 | 12/2005 | Kung et al. |
| 2006/0061107 | A1 * | 3/2006 | Cadaret ................ F03D 9/00 290/44 |
| 2006/0078034 | A1 | 4/2006 | Coffinberry |
| 2007/0051233 | A1 | 3/2007 | Duge |
| 2007/0104233 | A1 | 5/2007 | Vetrovec |
| 2007/0230519 | A1 | 10/2007 | Heo et al. |
| 2008/0265580 | A1 | 10/2008 | Sharp |
| 2008/0308671 | A1 | 12/2008 | Harnoy |
| 2009/0060748 | A1 | 3/2009 | Landa et al. |
| 2009/0249796 | A1 * | 10/2009 | Ullman ................ F25B 21/02 62/3.7 |
| 2009/0260781 | A1 * | 10/2009 | Ullman ................ F28D 20/021 165/104.21 |
| 2009/0302152 | A1 | 12/2009 | Knight |
| 2009/0308970 | A1 * | 12/2009 | Zank ................ F42B 15/105 244/3.1 |
| 2010/0044504 | A1 | 2/2010 | Cazals |
| 2010/0074736 | A1 | 3/2010 | Junod |
| 2010/0101233 | A1 | 4/2010 | Evans-Beauchamp |
| 2010/0157525 | A1 * | 6/2010 | Ullman ................ F28D 9/005 361/688 |
| 2010/0251726 | A1 | 10/2010 | Jones et al. |
| 2011/0033280 | A1 * | 2/2011 | Justak ................ B64D 41/007 415/73 |
| 2011/0115227 | A1 | 5/2011 | Shafer et al. |
| 2012/0160957 | A1 * | 6/2012 | Gagne ................ B64C 27/00 244/54 |
| 2012/0248242 | A1 * | 10/2012 | Gagne ................ B64D 13/006 244/58 |

(56) References Cited

U.S. PATENT DOCUMENTS

| | | | |
|---|---|---|---|
| 2012/0256045 A1* | 10/2012 | Gagne | F42B 15/34 244/57 |
| 2012/0299558 A1* | 11/2012 | Justak | B64D 41/007 322/28 |
| 2013/0111917 A1 | 5/2013 | Ho | |
| 2013/0170228 A1 | 7/2013 | Taylor | |
| 2013/0205821 A1 | 8/2013 | Shapiro | |
| 2014/0037423 A1* | 2/2014 | Weber | B64D 41/007 415/1 |
| 2014/0125964 A1 | 5/2014 | Jonas | |
| 2014/0153592 A1 | 6/2014 | Nishikata | |
| 2014/0153593 A1 | 6/2014 | Nishikata | |
| 2014/0346279 A1* | 11/2014 | Foo | B64D 39/02 244/135 A |
| 2015/0159552 A1* | 6/2015 | Rodriguez | F02C 6/18 290/2 |
| 2016/0031288 A1 | 2/2016 | Nishikata | |
| 2016/0031291 A1 | 2/2016 | Enomoto | |
| 2016/0153751 A1 | 6/2016 | Hagen | |
| 2016/0160864 A1 | 6/2016 | Becquin | |
| 2016/0216044 A1 | 7/2016 | Narine | |
| 2016/0236790 A1* | 8/2016 | Knapp | B64C 11/001 |
| 2017/0184022 A1* | 6/2017 | Stewart | F02C 7/042 |

OTHER PUBLICATIONS

Extended European Search Report, European Patent Application No. 12865093, Rolls-Royce North American Technologies, Inc., dated Sep. 22, 2014.

International Search Report and Written Opinion, PCT/US2012/030931, Rolls-Royce North American Technologies, Inc., dated Jun. 28, 2012.

Extended European Search Report, EP 12765288.1, Rolls-Royce North American Technologies, Inc., dated Nov. 26, 2014.

International Search Report and Written Opinion, PCT/US2012/030872, Rolls-Royce North American Technologies, Inc., dated Mar. 28, 2011.

Fellner, et al., "Rechargeable Lithium-Ion Based Batteries and Thermal Mgmt. for Airborne High Energy Electric Lasers," Proceedings of the 2006 SAE Power Systems Conf. Aug. 2006.

European Search Report in Corresponding European Patent Application (i.e. 12 764 181.9), dated Aug. 17, 2015 (8 pages).

International Search Report and Written Opinion, dated Jun. 29, 2012, PCT/US2012/030891.

Extended European Search Report for Patent Application No. 16163686.5, dated Jul. 22, 2016.

* cited by examiner

PHASE CHANGE MATERIAL COOLING SYSTEM FOR A VEHICLE

CROSS REFERENCE TO RELATED APPLICATIONS

The present application is a divisional application of U.S. patent application Ser. No. 13/432,590, filed on Mar. 28, 2012 and entitled "PHASE CHANGE MATERIAL COOLING SYSTEM FOR A VEHICLE," which claims the benefit of U.S. Provisional Patent Application Ser. No. 61/468,677, filed on Mar. 29, 2011 and entitled "VEHICLE SYSTEM." Each of the foregoing applications is expressly incorporated herein by reference in its entirety.

TECHNICAL FIELD

The present invention generally relates to vehicle systems, and more particularly, but not exclusively, to airborne thermal and power systems.

BACKGROUND

Providing thermal and/or power systems to payloads aboard vehicles such as aircraft remains an area of interest. Some existing systems have various shortcomings relative to certain applications. Accordingly, there remains a need for further contributions in this area of technology.

SUMMARY

One embodiment of the present invention is a unique system for delivering power and/or thermal conditioning services. Other embodiments include apparatuses, systems, devices, hardware, methods, and combinations for powering and cooling a payload aboard an aircraft. Further embodiments, forms, features, aspects, benefits, and advantages of the present application shall become apparent from the description and figures provided herewith.

DETAILED DESCRIPTION OF THE ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Figure 1:
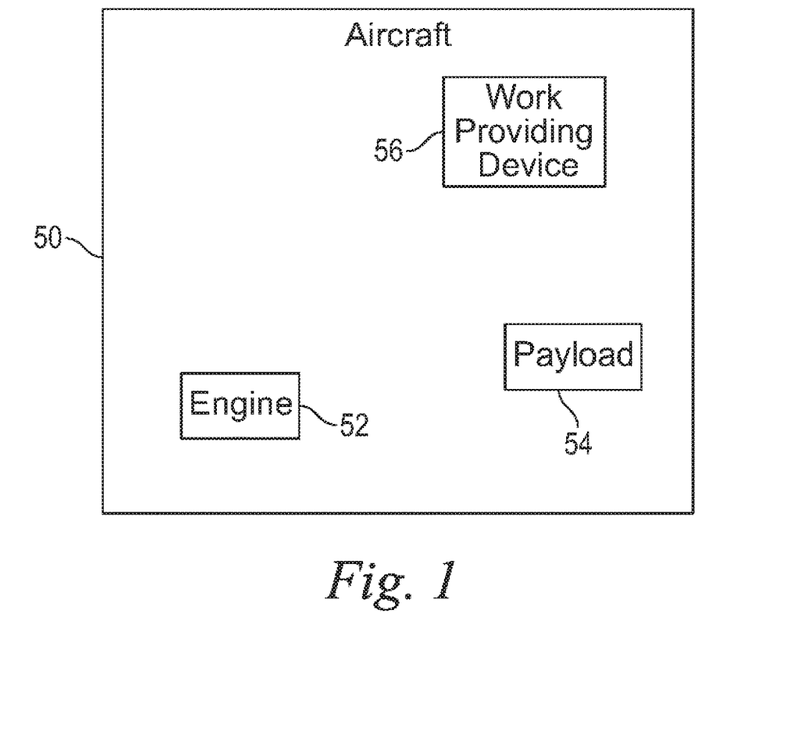
FIG. 1 depicts one embodiment of the instant application.

With reference to FIG. 1, an aircraft 50 is depicted having an engine 52 used to propel the aircraft 50. The aircraft 50 can be operated at a variety of altitudes and airspeeds and can take a variety of forms. As will be described further below, the aircraft 50 includes a payload 54 that can be powered by a work providing device 56. As used herein, the term "aircraft" includes, but is not limited to, helicopters, airplanes, unmanned space vehicles, fixed wing vehicles, variable wing vehicles, rotary wing vehicles, unmanned combat aerial vehicles, tailless aircraft, hover crafts, and other airborne and/or extraterrestrial (spacecraft) vehicles. Further, the present inventions are contemplated for utilization in other applications that may not be coupled with an aircraft such as, for example, naval vessels, security systems, perimeter defense/security systems, and the like known to one of ordinary skill in the art.

Though the aircraft 50 is depicted as having a single engine 52 in the illustrated embodiment, in some forms the aircraft 50 can have multiple engines. Whether having a single or multiple engines, any given engine 52 in any given application can take a variety of forms such as reciprocating engines and gas turbine engines. In one non-limiting application the engine(s) 52 can be AE 2100 engines provided by the Rolls-Royce Corporation located at 2100 South Tibbs Avenue, Indianapolis, Ind. The engine(s) 52 can be capable of powering useful devices aboard the aircraft 50, such as, but not limited to, cockpit lights, instruments, navigational aids and communication devices, to set forth just a few non-limiting examples. The engine(s) 52 can, but need not, be used to power a generator and provide environmental control aboard the aircraft 50.

In one embodiment the work providing device 56 can take the form of an ancillary engine which can take on a variety of forms capable of producing work that can be used to operate other devices. The working providing device 56 can be an internal combustion engine which can take on a variety of forms including, but not limited to, a turbine engine. In one particular non-limiting embodiment the working providing device 56 is a gas turbine engine. To illustrate just one non-limiting example, the working providing device 56 can be a M250 engine, or modified version thereof, provided by the Rolls-Royce Corporation located at 2100 South Tibbs Avenue, Indianapolis, Ind. For ease of description below, the work providing device 56 may alternately be an ancillary engine, and in some cases a gas turbine engine, but no limitation as to the work providing device 56 is intended. The working providing device 56 can be a non-propulsive engine in that the working providing device 56 can provide an insignificant amount of forward power, such as thrust, to the vehicle owing to the location, pressure, and flow rate of its exhaust. Such thrust as might be had from the exhaust can be much less than the thrust provided from the engine(s) 52.

In one embodiment the working providing device 56 can be a production engine that is nominally used to produce a motive force for an aircraft but otherwise modified for purposes of the instant application to act in a substantially non-propulsive capacity. Such a motive force for the production engine might have taken the form of a thrust, such as for example through a propeller in a turboprop engine or a helicopter rotor of a turboshaft, to set forth just two non-limiting examples. The engine might have also provided a thrust through a jet action. To set forth just two non-limiting examples of a production engine, the engine could be an existing helicopter or turboshaft power plant used in civilian or military applications. The internal combustion engine could also be a variant of a production engine. In one non-limiting embodiment of the variant, the internal combustion engine can be a core from a production engine used to provide a motive thrust for an aircraft, but otherwise modified to be used as a power source having uses described herein. For example, a high pressure compressor, turbine, and combustor can be used from an existing engine and modified for purposes of using the engine as the internal combustion engine described herein.

Figure 2:
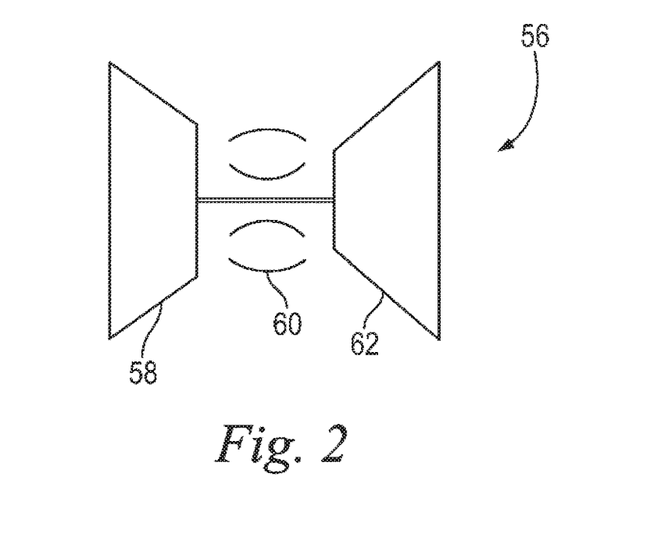
FIG. 2 depicts an embodiment of a gas turbine engine.

The working providing device 56 can be a gas turbine engine, an embodiment of which is shown in FIG. 2. The gas turbine engine can be capable of combusting a mixture of compressed air and fuel and extracting a power to be provided to useful components aboard the aircraft 50, whether that power is mechanical, electrical, or otherwise. In one form the working providing device 56 can include a compressor 58, combustor 60, and turbine 62. Though depicted as a single spool engine, the working providing device 56 can include greater numbers of components such as the compressor and turbine and can additionally include an additional spool(s).

The working providing device 56 can be used to provide power to the payload 54. In one embodiment the payload 54 receives electrical power from the working providing device 56. In one non-limiting form, the payload receives power from the working providing device 56 through a generator (not shown) that is powered by the working providing device 56. Such a generator, and/or associated electronics, can provide electrical power to the payload at a variety of power levels. The payload 54, furthermore, can be capable of receiving AC or DC power. In some forms the payload 54 can have associated electronics to convert, condition, or modify the power received from the generator into a power useful to its system.

In one form the payload 54 can be an energy device capable of producing a directional electromagnetic beam. In some forms the payload 54 can be a directed energy weapon. The weapon system can take the form of a high power microwave, or a high power laser based weapon system, to set forth just two non-limiting examples. The weapon system can be capable of being selectively employed during portions of the operation of the aircraft 50. In certain embodiments, some portions of the weapon system can be powered while others are not. In some applications the weapon system can be powered substantially during the entire operation of the aircraft, while in other applications the weapon system is substantially non-active to set forth just two non-limiting examples.

Figure 3:
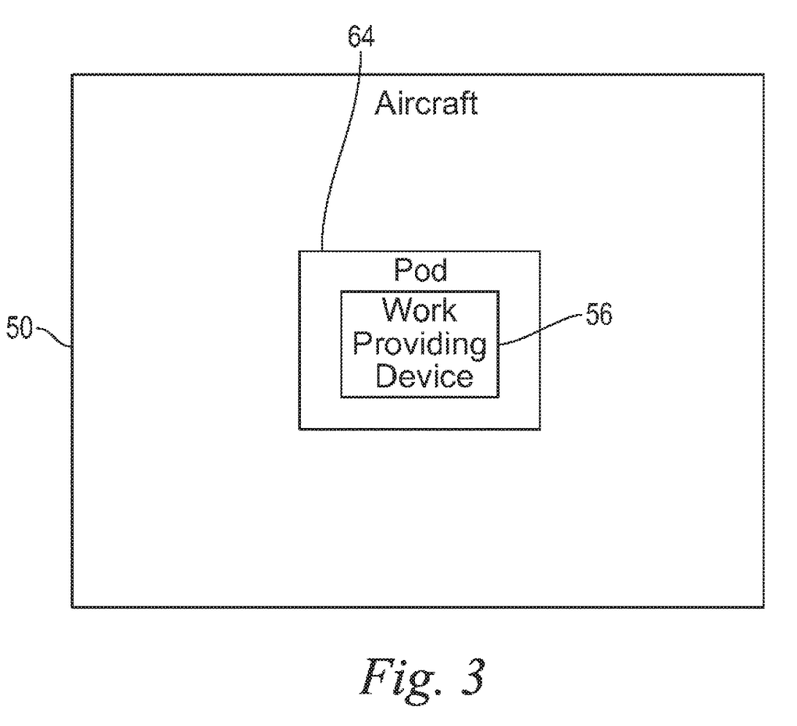
FIG. 3 depicts one embodiment of the instant application.

Turning now to FIG. 3, an embodiment of the aircraft 50 is shown having the work providing device 56 located in a pod 64. The pod 64 of the illustrated embodiment is coupled to the aircraft 50 and can be located in some embodiments such that it projects into a free stream. The pod 64 can be releasably coupled to the aircraft 50 or can be permanently affixed thereto. In one form the pod 64 includes a shape similar to an external fuel tank. The pod 64 can be located beneath a wing or a centerline of an aircraft, among other possible locations. The pod 64 can have a leading edge and a trailing edge and in one form has a symmetric shape about one or more axes or planes. In other embodiments the pod 64 need not be symmetric. The pod 64 can take a variety of forms and need not be entirely exposed to the free stream such as an external fuel tank is exposed. In some embodiments the pod 64 can take the form of a conformal fuel tank used on some types of aircraft to increase a load carrying capacity. Such a conformal structure need not be exposed to the free stream as some external fuel tanks are exposed.

Figure 4:
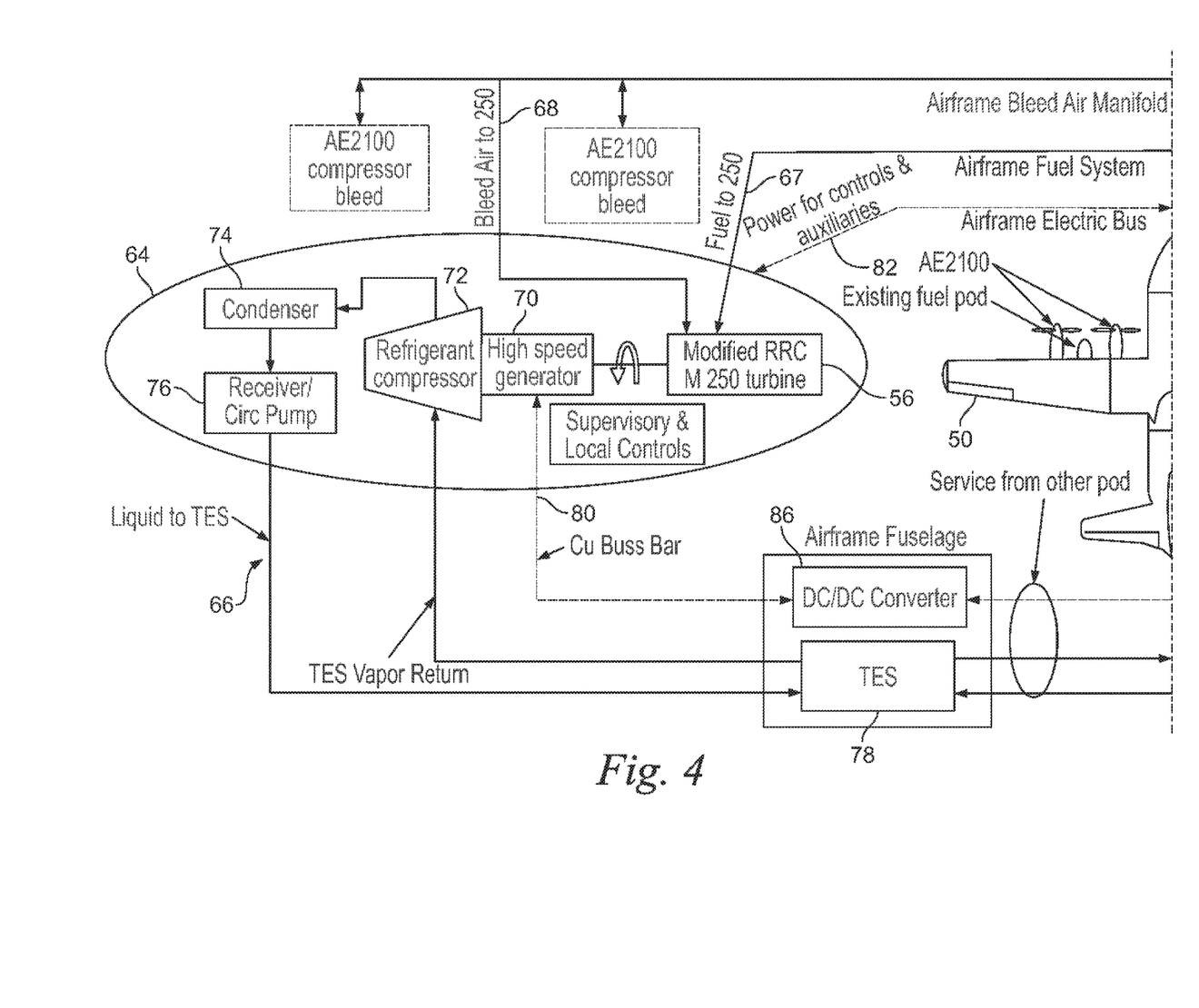
FIG. 4 depicts an embodiment of the instant application.

FIG. 4 depicts one embodiment of a thermal conditioning system 66 used in conjunction with the work providing device 56 located in the pod 64. As will be discussed further below, the work providing device 56 is used to provide power to the payload 54 (not shown) in the aircraft 50, as well as to provide power to the thermal conditioning system 66 which can be used to exchange heat with the payload 54.

The pod 64 is depicted as including a working providing device 56 configured to receive a fuel from the aircraft 50 via fuel passage 67. The fuel can be taken from a fuel reservoir used to provide fuel to the engines 52, but in other embodiments the fuel can originate from a separate reservoir. In other additional and/or alternative embodiments, the working providing device 56 can be configured to receive a fuel from a reservoir located within the pod 64. Such a reservoir can be supplied fuel from the aircraft and/or can be separate from any aircraft fuel systems. In the illustrative embodiment, the pod 64 is positioned on the aircraft 50 from the engine(s) 52, as shown in FIG. 4.

In the illustrated embodiment the working providing device 56 is provided bleed air from one or more engines 52 via a passage 68. In other additional and/or alternative embodiments the working providing device 56 can receive air from sources other than the bleed air depicted in the illustrated embodiment. The engine(s) 52 can be configured to provide bleed air for additional purposes other than to provide working providing device 56 with a source of air for its working cycle. Furthermore, the bleed air provided to the engine 56 can be modulated at a variety of locations between the engine(s) 52 and working providing device 56.

The working providing device 56 of FIG. 4 is structured to provide mechanical power to a power generation device 70 that, in one form, is a high speed generator. The power generation device 70 can take any variety of forms suitable for producing power derived from the working providing device 56 and can include power control electronics. One or more devices of the electrical, mechanical, and/or electromechanical kind can be used to provide for generation of electrical power. For example, any variety of gears, shafts, gear boxes, clutches, etc can be coupled between the working providing device 56 and the power generation device 70.

The thermal conditioning system 66 is operated using power from the working providing device 56, and in the illustrated embodiment is operated using power supplied by an intermediate power generation device 70. The thermal conditioning system 66 is depicted as a refrigerant cycle system having a refrigerant compressor 72, condenser 74, receiver/circulation pump 76, an evaporator (not shown), and a thermal energy storage device 78. Though the illustrated embodiment depicts devices useful to operate a cyclic refrigerant cycle thermal system, other types of thermal conditioning systems are contemplated herein. Furthermore, though a cyclic refrigeration cycle is used in combination with the thermal energy storage device 78, other devices capable of exchanging heat with the thermal energy storage device 78 are contemplated herein.

The thermal energy storage device 78 can be located in a fuselage of the aircraft 50, but other locations are also contemplated herein. In addition, the thermal energy storage device 78 can take the form of any device useful for storing and/or releasing energy. For example, in one non-limiting form the thermal energy storage device 78 can take the form of a phase change material capable of being placed in one phase and either releasing or absorbing heat to be placed into another phase. In one non-limiting example, a phase change material of the thermal energy storage device 78 can be used to absorb heat from the payload 54 and thereby change phase from a solid to a liquid and/or vapor. In another non-limiting example the phase change material could change from a liquid to a vapor. Once thermal energy storage device 78 has received an amount of thermal energy the thermal conditioning system 66 can be used to change the phase of the phase change material from a vapor to either a liquid or solid, or from a liquid to a solid. For example, a working fluid of the thermal conditioning system 66 after it has pass through an evaporator can be in thermal communication with the thermal energy storage device 78 to provide cooling. Any type of heat transfer mechanism is contemplated herein. The thermal energy storage device 78 in turn can be located in proximity to the payload 54 or can be in thermal communication with the payload 54 such as, for example, through conductivity to set for just one non-limiting possibility. In this way heat from the payload 54 is transferred to the thermal conditioning system 66 via the thermal energy storage device 78.

In one non-limiting example of operating the thermal energy storage device 78, if the payload 54 is operated in a way that increases its temperature, such as by operating a directed energy weapon 54, then the thermal energy storage device 78 can be used to absorb heat to maintain system temperatures within an acceptable level of the payload 54. The thermal energy storage device 78 can absorb heat and transfer the heat through cooling action of the thermal conditioning system 66. In one form a phase change material of the thermal energy storage device 78 absorbs sufficient heat to transition to a liquid. The thermal conditioning system 66 can be used to return the phase change material to a solid state ready to absorb heat upon another operation of the payload 54.

Though the power generation device 70 is shown in closer proximity to the refrigerant compressor 72 in the illustrated embodiment, it will be appreciated that the illustrated embodiment is only an example and other locations and arrangements are contemplated herein. Furthermore, though the compressor 72 is shown as capable of receiving electrical power from the power generation device 70, in some forms the compressor 72 can receive mechanical power from the work providing device 56. For example, in some embodiments the performance/operability of the compressor 72 can be dependent upon mechanical shaft speed, while in other embodiments the performance/operability can be independent on shaft speed when sufficient electrical power is generated by the power generation device 70. It will be appreciated that any variety of variations of mechanically driven compressor 72, electrically driven compressor 72 are contemplated herein.

The power generation device 70 is shown located in the fuselage and can provide power to the payload 54 as shown in the illustrated embodiment via power transmission 80. Locations other than the fuselage are also contemplated herein. The power generation device 70 can provide power to the payload 54 during operation of the aircraft 50. In some embodiments the power generation device 70 can be used to provide intermittent power to the payload 54.

The pod 64 in the illustrated embodiment also has provisions to receive power from the aircraft 50, via power transmission 82, to power one or more devices within the pod 64. In one non-limiting embodiment the power transmission 82 can provide power to controllers and/or auxiliaries located within the pod 64. In one form the power transmission 82 provides power to supervisory and/or local controls 84 within the pod 64. In some forms the devices can be located aboard the aircraft 50 and other transmission mechanisms can be used to convey information/power to systems within the pod 64.

Also illustrated in FIG. 4 is a DC/DC converter 86 useful for converting voltage delivered from the work providing device 56 to an acceptable voltage for use with the payload 54. Many different types of electrical components can be used to transition power from the work providing device 56 to the payload 54. For example, in one non-limiting embodiment an AC/DC converter can be used to convert from an a/c power provided by the power generation device 70 to the payload 54.

The dashed lines in the lower right hand corner of FIG. 4 indicates that in an embodiment having two pods, the airframe fuselage DC/DC converter and thermal energy storage system can be served by devices in the other pod.

Figure 5:
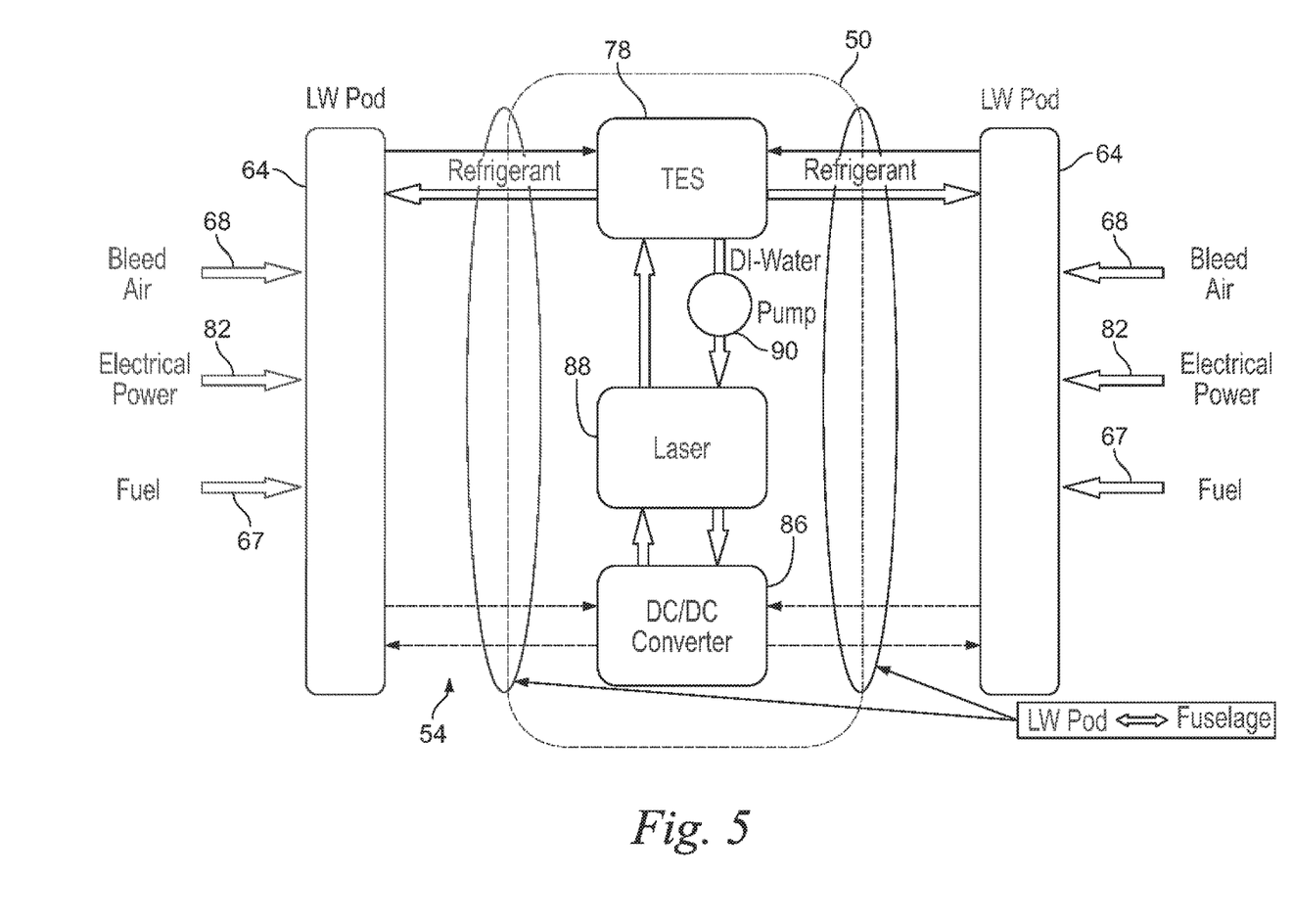
FIG. 5 depicts an embodiment of the instant application.

Turning now to FIG. 5, one embodiment illustrates the aircraft 50 including two separate pods 64, each capable of providing power and thermal conditioning to the payload 54. Though two pods 64 are illustrated in FIG. 5, it will be appreciated that other embodiments can include any number of pods. The payload 54 can include a directed energy device 88, such as a laser, which can be in thermal communication with the thermal energy storage device 78. The thermal energy storage device 78 is in thermal communication with the directed energy device 88 via a fluid that circulates by a pump 90. The fluid can be cooled by thermal energy storage device 78 and heated by the directed energy device 88.

As illustrated, each of the pods 64 are configured to receive bleed air, fuel, and electrical power from the aircraft 50. The pods are also configured to convey a working fluid, such as a refrigerant, from the thermal conditioning system 66 to the thermal energy storage device 78. The pods 64 are also configured to deliver power and/or accept power to the directed energy member 88. In one non-limiting form the directed energy member 88 provides electrical power to a converter 86 which supplies the power to the directed energy member 88.

In some forms of the instant application the work providing device 56 can be quickly coupled and decoupled from the aircraft 50. In additional and/or alternative forms the work providing device 56 can be coupled to one of the pod 64, payload 54, bus 80, or thermal conditioning system 66 at the same time that the pod 64 is attached or removed from the aircraft 50. In other forms the working producing device 56 can be attached to the aircraft 50 while in the pod 64 and then coupled with an installed one or more of the payload 54, bus 80, or thermal conditioning system 66.

One aspect of the present application provides an apparatus comprising vehicle having an internal combustion engine for providing motive force to enable movement of the vehicle, a work providing device apart from the internal combustion engine and structured to generate electrical power by a change in pressure of a fluid, a thermal conditioning system powered by the work providing device and having a working fluid and a phase transition material capable of transferring heat with a vehicle component, the working fluid capable of cooling the phase transition material to cause a change in phase of the phase transition material, and an electrically driven device disposed in the vehicle and configured to receive power from the work providing device, the electrically driven device having a relatively high temperature component in thermal communication with the phase transition material of the thermal conditioning system, the phase transition material at a temperature to cool the relatively high temperature component.

A feature of the present application provides wherein the vehicle is an airborne vehicle capable of producing lift, the internal combustion engine is capable of producing at least one of a thrust force and a lift force.

Another feature of the present application provides wherein the work providing device is fluid driven and structured to provide work to generate electrical power by a change in pressure of the fluid.

Still another feature of the present application provides wherein the vehicle is an aircraft having an external pod, the work providing device located in the external pod.

Yet still another feature of the present application further includes a second working fluid in thermal communication between the phase transition material and the relatively high temperature component, the second working fluid withdrawing heat from the relatively high temperature component and delivering heat to the phase transition material.

Still yet another feature of the present application provides wherein the vehicle includes a second external pod having a second work providing device.

A further feature of the present application provides wherein the work providing device is a turbine, and wherein the external pod includes an opening to receive an air, the air in fluid communication with the turbine.

A still further feature of the present application provides wherein the internal combustion engine is a gas turbine engine, and the air is a bleed air from the gas turbine engine.

Another aspect of the present application provides an apparatus comprising an aircraft having one or more propulsion engines and an external pod and including a turbine apart from the one or more propulsion engines, the turbine in power communication with an electrical generator and a heat exchange system that includes a phase change heat exchanger, the aircraft further including an implement in thermal communication with the heat exchange system.

A feature of the present application provides wherein the implement is an electrically driven implement.

Another feature of the present application provides wherein the implement is powered by the electrical generator and takes the form of a directed energy device.

Still another feature of the present application provides wherein the external pod includes an opening for receiving a gas in fluid communication with the turbine.

Yet still another feature of the present application provides wherein the turbine is located downstream of a combustor, the heat exchange system includes a first working fluid in thermal communication with the phase change heat exchanger.

Still yet another feature of the present application further includes a pump powered by the turbine, the pump circulating a second working fluid in thermal communication with the implement and the phase change heat exchanger, the first working fluid part of a vapor compression refrigeration system.

A further feature of the present application provides wherein the external pod includes coolant supply and coolant return lines as well as an electrical conduit in communication with the implement.

A still further feature of the present application provides wherein the heat exchange system includes a vapor compression refrigeration system having a working fluid in communication with the phase change heat exchanger.

Yet another aspect of the present application provides a method comprising combusting a fuel in an internal combustion engine to provide motive force for a vehicle, operating a work providing device to provide power to an electrically driven device aboard the vehicle, the work providing device separate from the internal combustion engine, elevating a temperature of the electrically driven device, cooling the electrically driven device, the cooling including: circulating a working fluid from work provided by the work providing device, and exchanging heat between the working fluid and a phase transition material.

A feature of the present application further includes turning an internal combustion engine turbine downstream of the combusting and wherein the work providing device includes a rotatable turbine, the work providing device located in an external compartment of the vehicle.

Another feature of the present application provides wherein the internal combustion engine is a turbine and the vehicle is an aircraft, wherein the work providing device is located in an external pod of the aircraft, and which further includes producing a directed electromagnetic beam from the electrically driven device.

Still another feature of the present application provides wherein the circulating includes expanding the working fluid to reduce the temperature thereof and condensing the working fluid by rejecting heat from the working fluid to a relatively low temperature sink, the circulating provided by a compressor.

Yet still another feature of the present application provides wherein the exchanging includes reducing the temperature of the phase transition material to cause a change in phase, which further includes halting operating of a directed energy weapon.

Still yet another feature of the present application further includes circulating a second working fluid, the working fluid receiving heat from the phase transition material, the phase transition material receiving heat from the second working fluid, and the second working fluid receiving heat from the electrically driven device.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus comprising:
an aircraft having one or more propulsion engines and an external pod including a turbine apart from the one or more propulsion engines, the turbine in power communication with an electrical generator and a heat exchange system that includes a working fluid in communication with a phase change heat exchanger, the aircraft further including an implement in thermal communication with the heat exchange system, the external pod including an electrical line in communication with the implement.

2. The apparatus of claim 1, wherein the implement is an electrically driven implement.

3. The apparatus of claim 2, wherein the implement is powered by the electrical generator and takes the form of a directed energy device.

4. The apparatus of claim 1, wherein the external pod includes an opening for receiving a gas in fluid communication with the turbine.

5. The apparatus of claim 4, wherein the turbine is located downstream of a combustor, the heat exchange system includes a first working fluid in thermal communication with the phase change heat exchanger.

6. The apparatus of claim 5, which further includes a pump powered by the turbine, the pump circulating a second working fluid in thermal communication with the implement and the phase change heat exchanger, the first working fluid part of a thermal conditioning system.

7. A method of operating an apparatus including a vehicle having one or more internal combustion engines and an external pod including a turbine apart from the one or more propulsion engines, the turbine in power communication with an electrical generator and a heat exchange system that includes a working fluid in communication with a phase change heat exchanger, the aircraft further including an implement in thermal communication with the heat exchange system, the external pod including an electrical line in communication with the implement, the method comprising:
    combusting a fuel in the one or more internal combustion engines to provide motive force for the vehicle;
    operating the turbine to provide power to an electrically driven device aboard the vehicle;
    elevating a temperature of the electrically driven device; and
    cooling the electrically driven device, including: circulating a working fluid to exchange heat between the working fluid and a phase transition material.

8. The method of claim 7, wherein the vehicle is an aircraft.

9. The method of claim 8, wherein the circulating includes expanding the working fluid to reduce the temperature thereof and condensing the working fluid by rejecting heat from the working fluid to a relatively low temperature sink, the circulating provided by a compressor.

10. The method of claim 7, wherein the circulating includes reducing the temperature of the phase transition material to cause a change in phase, which further includes halting operating of a directed energy weapon.

11. The method of claim 10, which further includes circulating a second working fluid, the working fluid receiving heat from the phase transition material, the phase transition material receiving heat from the second working fluid, and the second working fluid receiving heat from the electrically driven device.

* * * * *